US009981514B2

(12) United States Patent
Potter

(10) Patent No.: US 9,981,514 B2
(45) Date of Patent: May 29, 2018

(54) TRAILER HITCH COUPLER

(71) Applicant: Richard Potter, Riverton, WY (US)

(72) Inventor: Richard Potter, Riverton, WY (US)

( * ) Notice: Subject to any disclaimer, the term of this patent is extended or adjusted under 35 U.S.C. 154(b) by 0 days. days.

(21) Appl. No.: 15/138,376

(22) Filed: Apr. 26, 2016

(65) Prior Publication Data
US 2017/0015164 A1    Jan. 19, 2017

Related U.S. Application Data

(60) Provisional application No. 62/192,626, filed on Jul. 15, 2015.

(51) Int. Cl.
*B60D 1/06* (2006.01)
*B60D 1/36* (2006.01)

(52) U.S. Cl.
CPC .............. *B60D 1/363* (2013.01); *B60D 1/065* (2013.01)

(58) Field of Classification Search
CPC ........... B60D 1/36; B60D 1/363; B60D 1/065
USPC .......................... 280/433, 477, 511, 512, 513
See application file for complete search history.

(56) References Cited

U.S. PATENT DOCUMENTS

| | | | | |
|---|---|---|---|---|
| 2,237,031 A | * | 4/1941 | Gilmore | B60D 1/065 280/513 |
| 2,847,234 A | * | 8/1958 | Clark | B60D 1/065 280/512 |
| 3,421,780 A | * | 1/1969 | Rimmey | B60D 1/02 280/477 |
| 3,730,559 A | * | 5/1973 | Ray | B60D 1/065 280/513 |
| 3,773,356 A | * | 11/1973 | Eichels | B60D 1/363 280/477 |
| 4,416,466 A | | 11/1983 | Park | |
| 4,657,276 A | * | 4/1987 | Hamerl | B60D 1/065 280/477 |
| 5,114,170 A | | 5/1992 | Lanni | |
| 5,927,742 A | | 7/1999 | Draper | |
| 6,000,710 A | * | 12/1999 | Schocker | B60D 1/065 280/507 |
| 6,102,422 A | * | 8/2000 | Damron | B60D 1/065 280/477 |
| 6,796,573 B2 | | 9/2004 | Beaudoin | |

(Continued)

FOREIGN PATENT DOCUMENTS

DE    19842093    * 5/1999    ............... B60D 1/06

*Primary Examiner* — Anne Marie M Boehler
(74) *Attorney, Agent, or Firm* — Global Intellectual Property Agency, LLC; Jordan Sworen

(57) ABSTRACT

A trailer hitch coupler is provided that facilitates alignment of a ball mount with the ball socket distal end of the coupler when connecting a towing vehicle to a trailer. The ball socket distal end of the coupler includes an open interior with a rounded interior surface that is adapted to receive a ball mount therein, which can be optionally locked in place. Extending outwardly from the ball socket distal end is a guide flange that is used to guide a ball mount towards the ball socket of the coupler. The guide flange comprises a lower surface that extends radially outward and upwardly from the lower edge ball socket distal end, and bears against a ball mount that is being positioned in the ball socket. In one embodiment, the guide flange has a semi-circular outer edge and includes downward lateral edges that extend laterally outward from the ball socket.

9 Claims, 6 Drawing Sheets

(56) References Cited

U.S. PATENT DOCUMENTS

| | | | |
|---|---|---|---|
| 7,571,922 B2* | 8/2009 | Pratchler | B60D 1/065 |
| | | | 280/477 |
| 7,690,671 B1 | 4/2010 | Jensen | |
| 8,757,654 B2* | 6/2014 | Lachance | B60D 1/28 |
| | | | 280/507 |
| 9,272,590 B2* | 3/2016 | Hochanadel | B60D 1/363 |
| 2007/0205580 A1* | 9/2007 | Hamilton | B60D 1/66 |
| | | | 280/477 |

* cited by examiner

TRAILER HITCH COUPLER

CROSS REFERENCE TO RELATED APPLICATION

This application claims the benefit of U.S. Provisional Application No. 62/192,626 filed on Jul. 15, 2015. The above identified patent application is herein incorporated by reference in its entirety to provide continuity of disclosure.

BACKGROUND OF THE INVENTION

Field of the Invention

The present invention relates to trailer vehicles and trailer hitch couplers. More specifically, the present invention relates to improved trailer hitch couplers that facilitate coupling a ball mount on a lead vehicle to the trailer hitch coupler of the trailer vehicle.

The present invention provides improvements in the design of ball and socket hitches. Conventional vehicle ball and hitch couplers require at least two people: a driver and a third party to direct the driver when aligning the ball mount of the trailer hitch with the hitch coupler of the trailer. Without help from another person, the driver cannot see the ball and coupler members while maneuvering the vehicle. This causes the driver to make several adjustments and evaluations that require the driver to exit and enter the vehicle repeatedly.

Conventional vehicle ball and trailer hitch couplers require a driver to judge the positions of each member precisely while backing up the towing vehicle. In order to secure the coupler to the ball mount, the ball mount must be within a few centimeters of the coupler, particularly if the trailer is too large to make final adjustments manually. Therefore, the driver must accurately position the ball mount below the coupler in order make a proper connection. This involves accuracy in a horizontal plan, while also ensuring the ball mount is positioned below the coupler. Without a third party to assist this process, maneuvering the vehicle into the correct position can be overly laborious. There exists a need therefore for a device that can provide a guide to a ball mount when positioning the ball mount relative to a socket coupler of a trailer vehicle.

The present invention provides a new and improved trailer hitch coupler in which the correct positioning of a ball mount relative to the coupler is facilitated even if slight vertical or horizontal misalignments are present. In particular, the present invention provides a heavy socket trailer hitch with a guide flange extending therefrom to guide the ball mount into the ball mount distal end of the coupler even if the ball mount is slightly above the coupler or misaligned therewith. The guide flange extends upwardly and flares out radially from the ball mount distal end of the trailer hitch coupler. The guide flange lower surface is adapted to guide a ball mount, which slides along the lower surface until ultimately seating within the ball mount distal end of the trailer hitch coupler. In this manner, slight misalignment is accounted for and the user can engage a ball mount to the coupler without exacting precision. Moreover, the need for third party assistance is reduce or eliminated.

SUMMARY OF THE INVENTION

The following summary is intended solely for the benefit of the reader and is not intended to be limiting in any way. The present invention provides a new trailer hitch coupler that can be utilized for facilitating coupling between a ball mount of a towing vehicle and the ball socket of the trailer hitch coupler.

It is therefore an object of the present invention to provide a new and improved trailer hitch coupler device that has all of the advantages of the prior art and none of the disadvantages.

It is another object of the present invention to provide a trailer hitch coupler that comprises an elongated body portion, a proximal end, a ball socket distal end, and a guide flange extending from the ball socket distal end.

Another object of the present invention is to provide a trailer hitch coupler in which the elongated body portion comprises a substantially rectangular cross section with an upper surface and a pair of side surfaces, whereby the elongated body portion is adapted to be connected to a trailer vehicle.

Another object of the present invention is to provide a trailer hitch coupler in which the ball socket distal end further comprising an open interior with a rounded interior surface that is adapted to receive the ball mount of a trailer hitch therein.

Another object of the present invention is to provide a trailer hitch coupler in which the ball socket distal end has an outer wall with a lower edge, whereby the guide flange extends outwardly from the lower edge.

Another object of the present invention is to provide a trailer hitch coupler in which the guide flange comprises a lower surface that extends outwardly and upwardly from the lower edge of the outer wall of the ball socket distal end. The lower surface of the guide flange is adapted to bear against a ball mount and guide the ball mount into the rounded interior surface of the ball socket distal end when connecting the ball mount to the hitch coupler.

Another object of the present invention is to provide a trailer hitch coupler in one embodiment in which the guide flange extends outward in a radial direction, forming a semi-circular outer edge that is disposed above the ball socket distal end when the hitch coupler is in a level state.

Another object of the present invention is to provide a trailer hitch coupler in one embodiment in which one or more support flanges extend between an outer surface of the ball socket distal end and the semi-circular outer edge of the guide flange. The support flanges provide structural support for the guide flange as the ball mount bears thereagainst.

Another object of the present invention is to provide a trailer hitch coupler in which the guide flange further comprises an outer edge and a pair of lateral edges. The outer edge forms a semi-circular edge while the lateral edges include edge flanges that extend laterally outward from both sides of the ball socket distal end and are oriented substantially vertically. The edge flanges act as a backstop to the ball mount if misaligned with the ball socket of the coupler.

Another object of the present invention is to provide a trailer hitch coupler in which the edge flanges further comprise a lower edge that is substantially parallel to the upper surface of the elongated body portion of the hitch coupler.

Another object of the present invention is to provide a trailer hitch coupler in which the elongated body portion of the coupler further comprises a substantially open, rectangular interior volume and an open proximal end, whereby the proximal end and the interior volume are adapted to receive a trailer tongue therein.

Another object of the present invention is to provide a trailer hitch coupler wherein the elongated body portion of the coupler further comprises a plurality of fastener holes therethrough for receiving coupling fasteners that affix the coupler to the trailer tongue.

Another object of the present invention is to provide a trailer hitch coupler in which a ball mount locking mechanism is provided. The ball mount locking mechanism comprises a handle latch that is pivotably attached to the upper surface of the hitch coupler, an underjaw disposed within an interior of the hitch coupler, and a post connecting the handle latch to the underjaw. The post extends through the upper surface of the body portion of the hitch coupler, whereby rotation of the handle latch into a locked state raises the post and draws the underjaw towards the ball socket distal end. Finally, the underjaw having a rounded surface adapted to bear against the ball mount disposed within the ball socket distal end, thereby clamping the ball mount between the underjaw and the rounded interior surface of the ball socket distal end.

Another object of the present invention is to provide a trailer hitch coupler in which the ball mount locking mechanism further comprises a coil spring disposed along the post and between the handle latch and the underjaw that is adapted to maintain tension underjaw and the handle latch.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
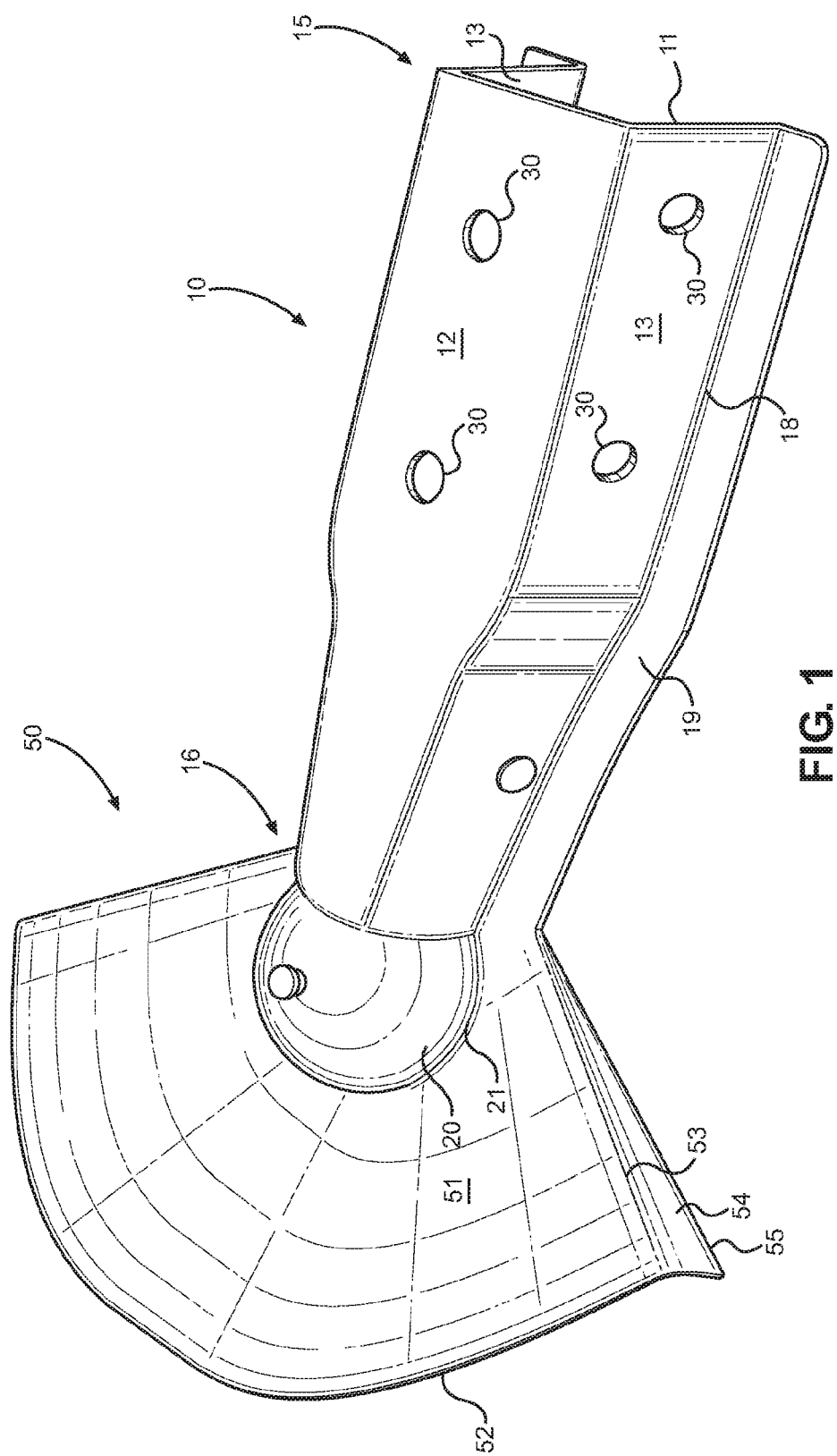
FIG. 1 shows an overhead perspective view of an embodiment of the trailer hitch coupler of the present invention.

Reference is made herein to the attached drawings. Like reference numerals are used throughout the drawings to depict like or similar elements of the trailer hitch coupler of the present invention. For the purposes of presenting a brief and clear description of the present invention, the preferred embodiment will be discussed as used for guiding a ball mount into the ball mount distal end of the trailer coupler using a guide flange. The figures are intended for representative purposes only and should not be considered to be limiting in any respect.

Figure 2:
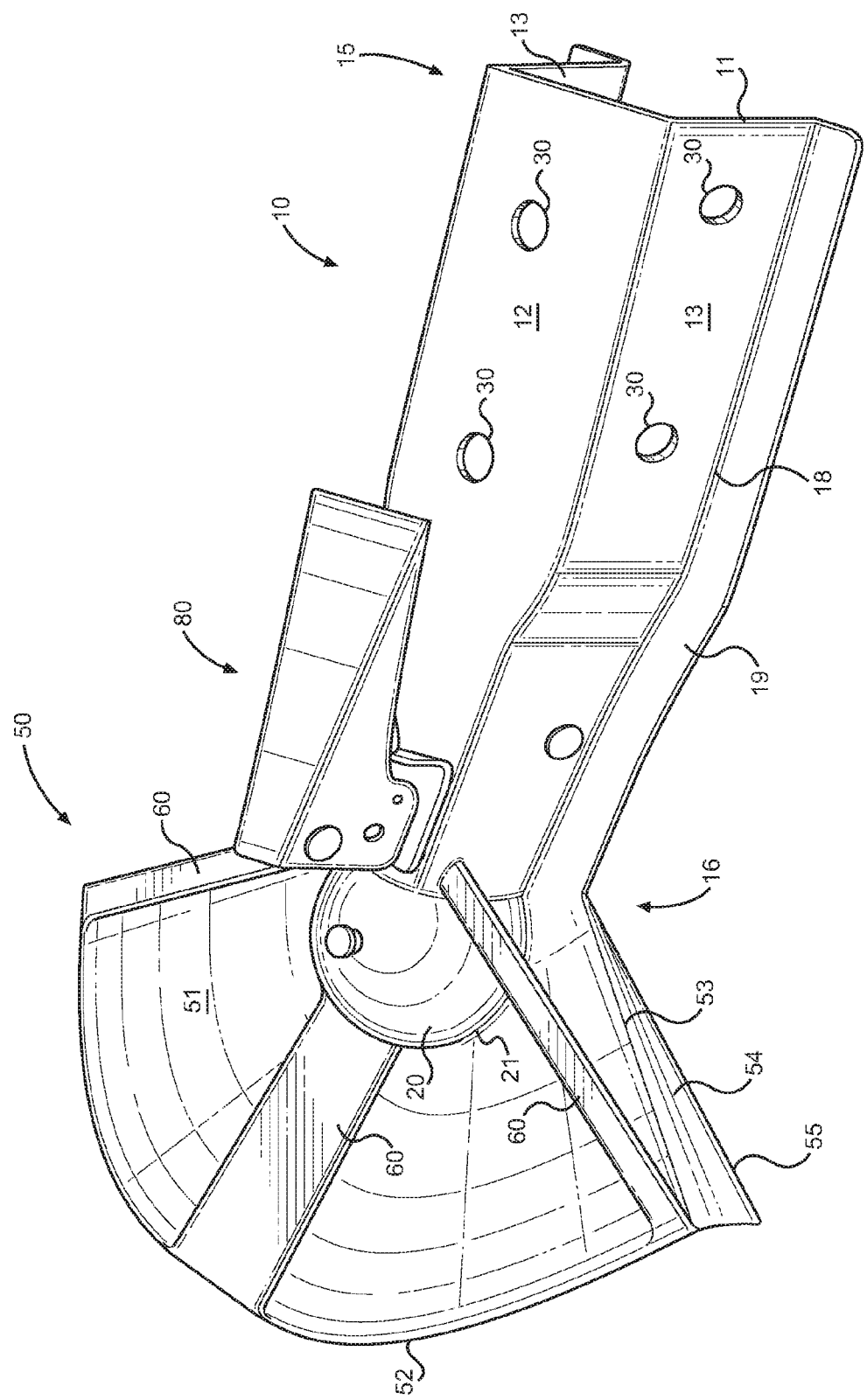
FIG. 2 shows an overhead perspective view of another embodiment of the trailer hitch coupler of the present invention.

Referring now to FIGS. 1 and 2, there are shown overhead perspective views of embodiments of the trailer hitch coupler 10 of the present invention. The trailer hitch coupler 10 is one that allows the ball mount of a towing vehicle hitch secure to the trailer, whereby the trailer hitch coupler 10 of the present invention furthermore facilitates coupling of the ball mount thereto while maneuvering the towing vehicle into a position to connect the two. The coupler 10 of the present invention comprises a body portion with a proximal end 15, a ball socket distal end 16, and an elongated length. The coupler 10 may be a separable component that is removably affixed to the tongue of a trailer, or one that is permanently affixed to the tongue of a trailer.

The ball socket distal end 16 of the coupler comprising an open interior with a rounded interior surface that is adapted to receive the ball mount of a trailer hitch therein. The ball socket distal end 16 may further comprise a rounded end outer wall 20, a lower edge 21, and an open lower surface. The ball mount is received through the open lower surface and the rounded ball mount bears against the rounded interior surface of the ball socket distal end 16. Once the ball mount is received therein, the coupler 10 is connected to the hitch of the towing vehicle. An additional locking mechanism 80 may also secure the ball mount in the ball socket distal end 16 to prevent separation while the trailer is in use.

When securing a ball mount to a coupler, the towing vehicle must maneuver the vehicle such that the ball mount is positioned below the ball mount distal end 16 of the coupler 10. To facilitate this, a guide flange 50 extends outward from the lower edge 21 of the outer wall 20 of the ball socket distal end 16. The guide flange 50 is a surface with a greater surface area than the open lower surface of the ball socket distal end, and is configured to bear against a ball mount as it is positioned in proximity to the ball socket distal end. The flange 50 extends outward and is adapted to account for misalignments between the ball mount and the ball socket distal end 16 of the coupler 10.

Referring to FIGS. 1-4, additional views of the guide flange 50 and the coupler 10 are provided. The guide flange 50 comprising a rigid surface that extends outward from the coupler distal end. The flange 50 comprises a lower surface 59, an upper surface 51, an outer edge 52, and a pair of lateral edges 53. The flange 50 extends outwardly and upwardly from the lower edge 21 of the outer wall 20 of the ball socket distal end 16, thereby forming a three dimensional surface that accounts for misalignments of the ball mount in the vertical and horizontal directions relative to the distal end 16 of the coupler 10. The lower surface 59 of the guide flange 50 is adapted to bear against a ball mount and guide the ball mount into the rounded interior surface 23 of the ball socket distal end 16 when connecting the ball mount to the hitch coupler 10. This allows the driver of a towing vehicle to make connection with the coupler 10 despite misalignments when reversing the towing vehicle towards the coupler 10. The ball mount contacts the flange lower surface 59, which in turn causes the ball socket distal end 16 of the coupler 10 to elevate and/or the ball mount to be pressed downward by the flange 50 before ultimately being received within the rounded interior 23 of the ball socket distal end 16.

In a preferred embodiment, the guide flange 50 extends both upwardly and radially outward from the ball socket distal end 16 of the coupler. The flange 50 connects to the lower edge 21 of the outer wall 20 of the ball socket distal end 16 and extends upwardly and outwardly in a radial pattern. Therefore, the flange 50 forms a fan shape that biases the ball mount in contact with the lower surface 59 thereof into the ball socket interior 23. Specifically, the flange 50 may extend outward in a radial pattern to form a semi-circular or rounded outer edge 52 that is disposed above the ball socket distal end 16 when the hitch coupler 10 is in a level state.

In addition to the flange upper and lower surfaces, the flange 50 may further comprise lateral edges 53 that form the outer extent or outer edge of the guide flange 50. The lateral edges 53 extend outward from the lower edge 21 of the outer wall 20 of the ball socket distal end 16. Extending downward from the lateral edges 21 of the flange 50 may be upright edge flanges 54, which act as backstops for the ball mount in the event of a misalignment. The edge flanges 54 extend downward from each of the lateral edges 53 and have a lower edge 55. The lower edge 55 of the edge flanges 54 is substantially parallel to the upper surface 12 of the elongated body portion of the hitch coupler 10. In this manner, the lower edge 55 forms a level edge when the coupler 10 is in a horizontal or level condition. The lower edge 55 may also extend downward from this level position in some embodiments.

The edge flanges 54 of the guide flange 50 prevent the ball mount from sliding past the ball socket distal end 16 of the coupler 10. The edge flanges 54 bear against the ball mount when the ball mount is misaligned to one side of the ball socket, thereby stopping the rearward motion of the ball mount and guiding the ball mount toward the ball socket. The lateral edges 53 of the guide flange 50 preferably form an obtuse angle between each lateral edge 53 and the length of the coupler 10. In this way, when the ball mount contacts the edge flanges 54, the ball mount is biased toward the ball socket rather than being resisted completed by a perpendicular wall.

Figure 5:
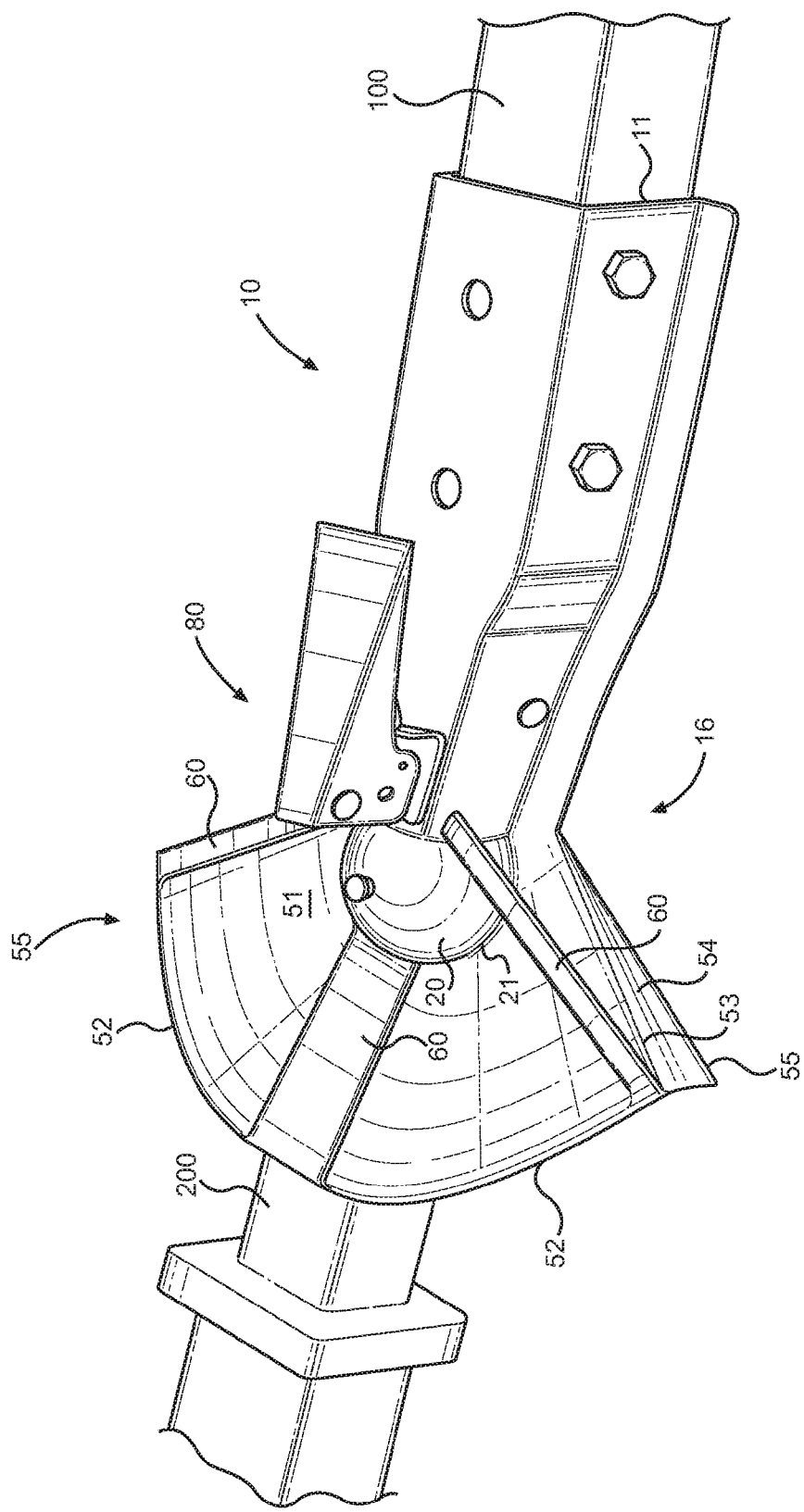
FIG. 5 shows an overhead perspective view of the trailer hitch coupler connected to a ball mount of a towing vehicle.

Referring to FIGS. 2 and 5, there are shown views of an embodiment of the guide flange 50 that includes additional structural support. While the guide flange 50 comprises a surface with sufficient thickness to prevent deformation when bore upon by a ball mount, it is contemplated that one or more one or more support flanges 60 may be provided that extend between the outer wall 20 of the ball socket distal end 16 and the outer surface 51 of the guide flange 50. The flanges 60 comprise structural ties that reinforce the guide flange 50 during operation. The support flanges 60 may connect to the guide flange 50 along its outer surface 51, or alternatively the support flanges 60 may extend to the semi-circular outer edge 52 of the guide flange 50 and secure thereto. Additionally, the support flanges may be connected to the outer surface 51 of the guide flange 50 along the entire length of the support flange, forming an upstanding web that reinforces the guide flange 50 by providing additional bending and shear load capability.

The trailer coupler 10 of the present invention is one that can be integrally affixed onto the tongue 100 of a trailer vehicle, or one that is removable therefrom. In one embodiment, and as provided in FIGS. 1-5, the trailer coupler 10 comprises an elongated body portion with an upper surface 12 and a pair of side surfaces 13 forming a substantially rectangular cross section. The proximal end 15 of the coupler comprises an opening 11, whereby the opening 11 and the open interior volume of the coupler are sized to receive the tongue 100 of a trailer therein. The coupler 10 may further comprise a lower edge 15 and a lower flange 19 extending therefrom for increased structural stability. Along the elongated body portion of the coupler 10 is a plurality of fastener holes 30 that extend therethrough for receiving coupling fasteners 35 through the coupler body 10 and the tongue 100 of a trailer. At the distal end of the coupler body portion is the ball socket distal end 16 that is adapted to make connection with a ball mount 201 and secure the coupler 10 thereto.

To ensure the ball mount 201 is secured within the rounded interior 23 of the ball socket distal end 16 of the coupler 10, a ball mount locking mechanism 80 may be provided. As shown in FIGS. 2-6, the ball mount locking mechanism 80 is one that secures the ball mount 201 against the interior surface 23 of the ball socket 16 once the ball mount 201 is seated therein. After the ball mount 201 slides along the guide flange 50 and is directed into the ball socket 16, the locking mechanism forces the ball mount 201 against the socket 16 to prevent separation while towing. Several mechanisms are contemplated.

In one embodiment, the ball mount locking mechanism further comprises a handle latch 88 that is pivotably attached to the upper surface 12 of the hitch coupler 10. The latch 88 operates an underjaw member 81 disposed within the interior of the hitch coupler. The underjaw 81 is a curved member that is movable between a locked and unlocked position by the latch 88. In a locked position, the underjaw 88 pressed against the curved outer surface 205 of the ball mount 201, thereby forcing the ball mount 201 against the interior surface 23 of the ball socket. The underjaw 81 is pivoted into position using the handle latch 88 and is actuated by the user.

Figure 3:
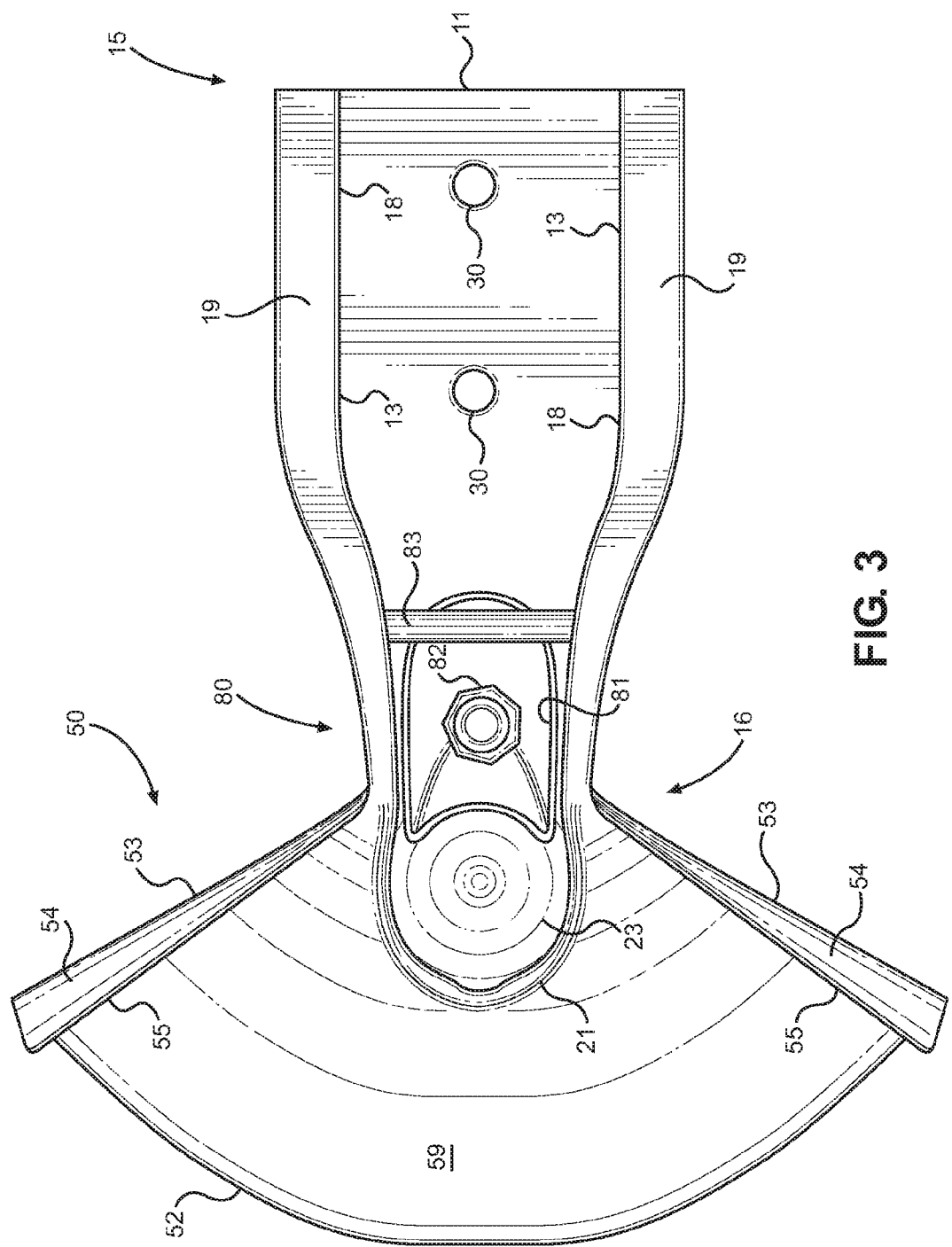
FIG. 3 shows an underside view of the trailer hitch coupler of the present invention.
Figure 4:
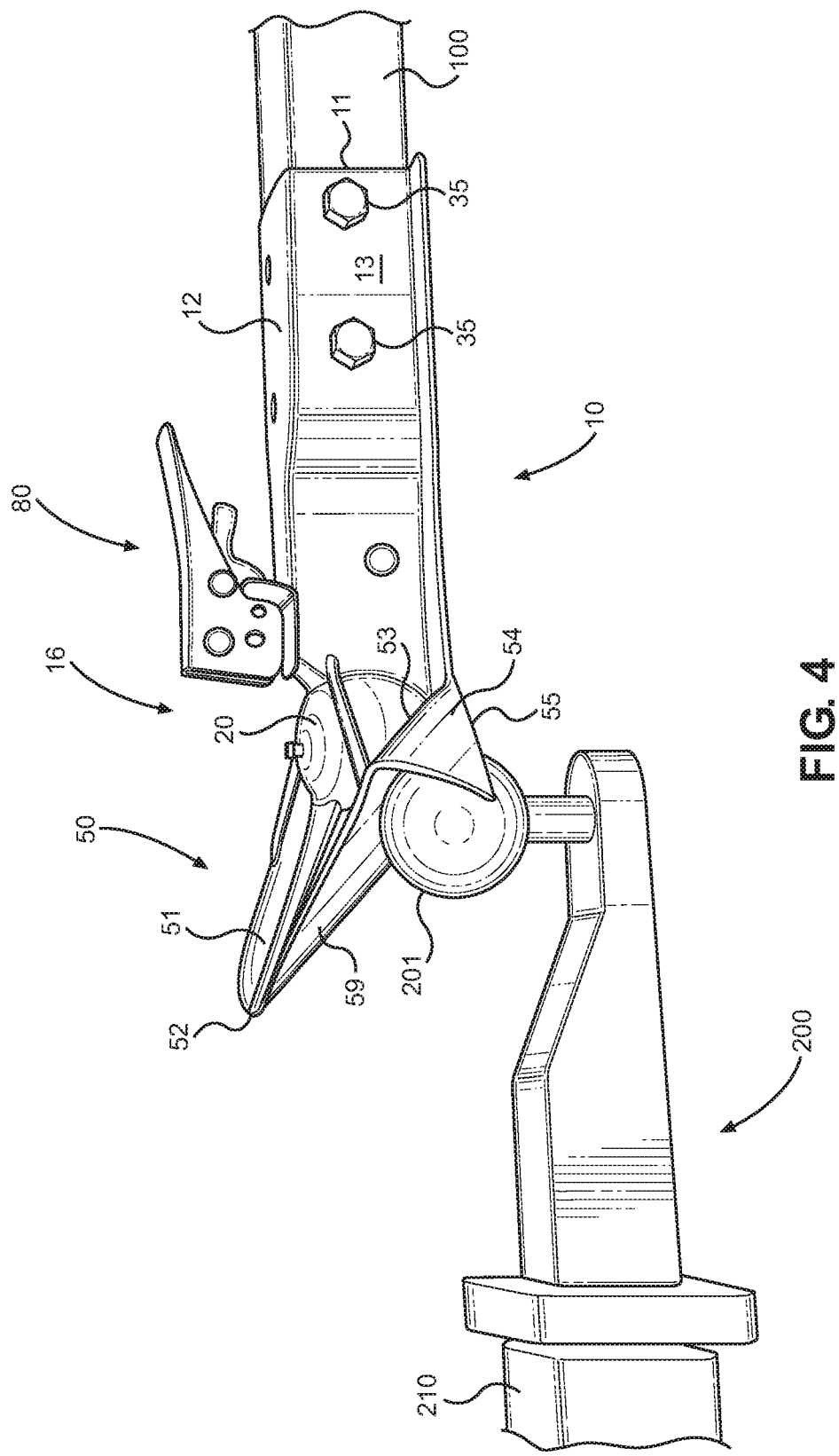
FIG. 4 shows a side view of the trailer hitch coupler being connected to a ball mount of a towing vehicle.
Figure 6:
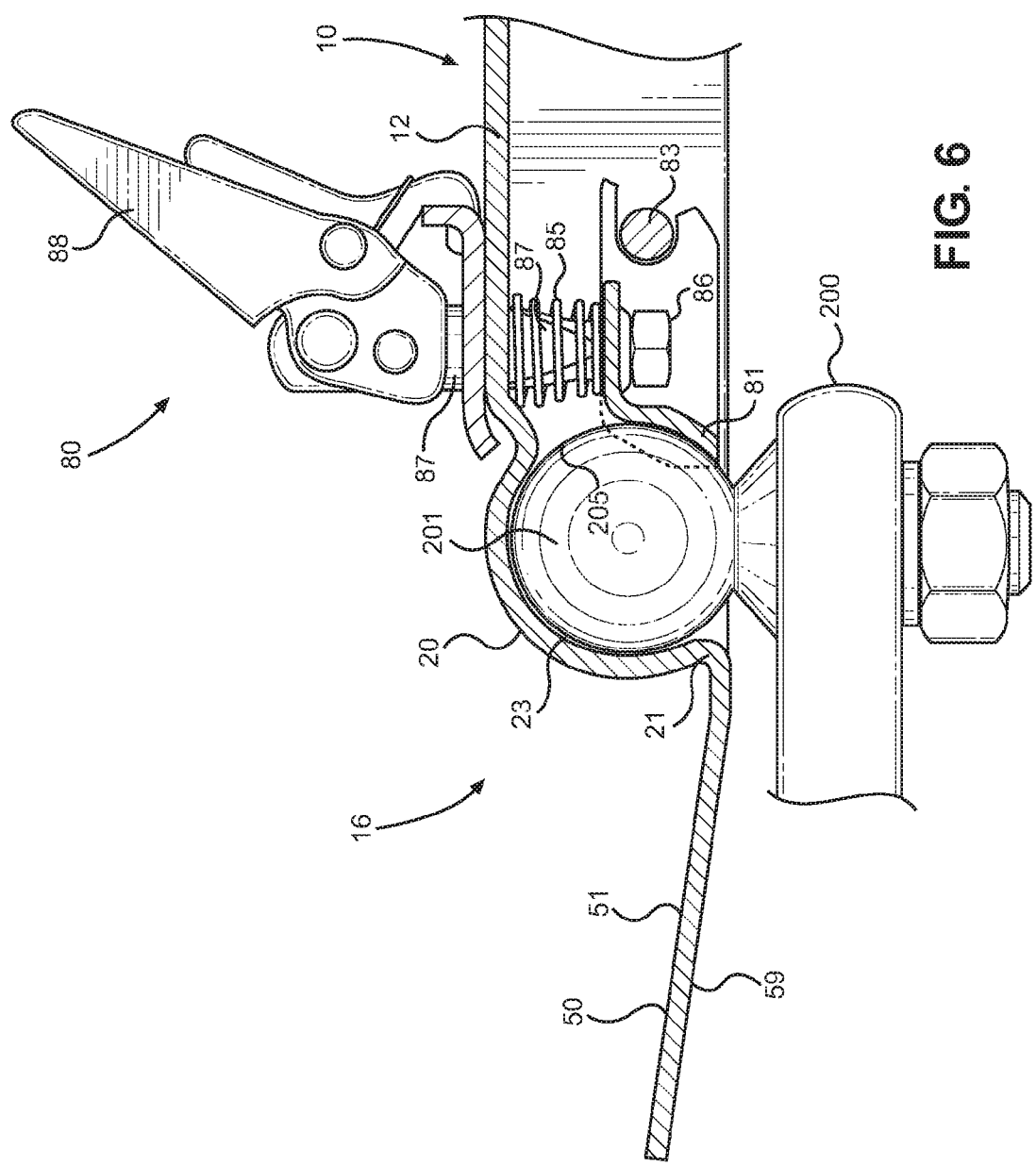
FIG. 6 shows a cross section view of the trailer hitch coupler in connection with the ball mount, along with the ball mount locking mechanism in a working state.

Referring specifically to FIGS. 3 and 6, there are shown detailed views of an embodiment of the ball mount locking mechanism 80 of the present invention. The underjaw 81 is connected to a post 87 that extends vertically upwards through the upper surface 12 of the coupler and to the handle latch 88. The post 86 is retained against the underjaw 81 by a threaded nut 86 thereunder. The handle latch 88, in turn, is rotatably affixed along the upper surface of the coupler. Rotation of the handle latch 88 moves the post 87 upwards and downwards, which moves underjaw 81 between a locked and unlocked sates. In a locked state, the handle latch 88 raises the post 87 and draws the underjaw 81 against the ball mount 201 disposed in the ball socket distal end 16 of the coupler.

The underjaw 81 has a rounded surface that adapted to bear against the ball mount 201 disposed within the ball socket distal end 16, thereby clamping the ball mount 201 between the underjaw 81 and the rounded interior surface 23 of the ball socket distal end 16. A coil spring 85 places tension on the post and prevents the latch 88 moving from a locked position without user interaction. Finally, an internal horizontal post 83 is provided to rotate the underjaw 81 as it moves between a locked and unlocked state, thereby angling the rounded surface of the underjaw 81 to appropriately mate with the rounded surface 205 of the ball mount 205. The horizontal post 83 also serves as a support for the underjaw 81 when in a locked condition.

Overall, the present invention provides an improved trailer coupler device that assists making connection between a ball mount and the ball socket of a trailer coupler. The design of the locking mechanism and the exact shape of the guide flange may vary, falling within the scope of providing a guide surface upon which a ball mount can slide and one that biases the ball mount towards the ball socket by virtue of the curvature of the guide flange.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch coupler, comprising:
a hitch coupler having an elongated body portion, a proximal end, and a ball socket distal end;
the elongated body portion comprises a substantially rectangular cross section with an upper surface and a pair of side surfaces, whereby the elongated body portion is adapted to be connected to a trailer vehicle;
the ball socket distal end further comprising an open interior with a rounded interior surface that is adapted to receive a ball mount of a trailer hitch therein;
the ball socket distal end having an outer wall with a lower edge;
a guide flange extending outward from the lower edge of the outer wall of the ball socket distal end;
the guide flange including a height such that an outer edge of the guide flange is disposed above the ball socket distal end when the trailer hitch coupler is level;
the guide flange comprising a lower surface that extends outwardly and upwardly from the lower edge of the outer wall of the ball socket distal end; and
whereby the lower surface is adapted to bear against the ball mount and guide the ball mount into the rounded interior surface of the ball socket distal end when connecting the ball mount to the hitch coupler;
a pair of lateral structural ties extending between the hitch coupler and the outer edge of the guide flange, the pair of lateral structural ties configured to buttress the guide flange;
the pair of lateral structural ties and an upper surface of the guide flange forming a gap therebetween.

2. The trailer hitch coupler of claim 1, wherein:
the guide flange extends outward in a radial direction, the outer edge forming a rounded edge.

3. The trailer hitch coupler of claim 1, wherein:
the guide flange further comprises a pair of lateral edges;
the outer edge forming a rounded edge;
the lateral edges extending laterally outward from both sides of the ball socket distal end.

4. The trailer hitch coupler of claim 3, further comprising edge flanges that extend downward from each of the lateral edges.

5. The trailer hitch coupler of claim 4, wherein the edge flanges each further comprise a lower edge that is substantially parallel to the upper surface of the elongated body portion of the hitch coupler.

6. The trailer hitch coupler of claim 1, wherein:
the elongated body portion further comprises a substantially rectangular interior volume and the proximal end is open, whereby the proximal end and the interior volume are adapted to receive a trailer tongue therein.

7. The trailer hitch coupler of claim 1, wherein:
the elongated body portion further comprises a plurality of fastener holes therethrough for receiving coupling fasteners therethrough.

8. The trailer hitch coupler of claim 1, further comprising:
a ball mount locking mechanism;
the ball mount locking mechanism comprising a handle latch that is pivotably attached to the upper surface of the hitch coupler, an underjaw disposed within an interior of the hitch coupler, and a post connecting the handle latch to the underjaw;
the post extends through the upper surface of the body portion of the hitch coupler, whereby rotation of the handle latch into a locked state raises the post and draws the underjaw towards the ball socket distal end;
the underjaw having a rounded surface adapted to bear against the ball mount disposed within the ball socket distal end, thereby clamping the ball mount between the underjaw and the rounded interior surface of the ball socket distal end.

9. The trailer hitch coupler of claim 8, further comprising:
a coil spring disposed along the post and between the handle latch and the underjaw that is adapted to maintain tension between the underjaw and the handle latch.

* * * * *